(12) United States Patent
Burger et al.

(10) Patent No.: US 12,485,548 B2
(45) Date of Patent: Dec. 2, 2025

(54) ROBOTIC IMAGING SYSTEM AND METHOD FOR CONTROLLING A ROBOTIC DEVICE

(71) Applicant: BHS Technologies GmbH, Innsbruck (AT)

(72) Inventors: Gregor Burger, Völs (AT); Mark Capelli, Innsbruck (AT); Michael Santek, Götzens (AT)

(73) Assignee: BHS Technologies GmbH, Innsbruck (AT)

( * ) Notice: Subject to any disclaimer, the term of this patent is extended or adjusted under 35 U.S.C. 154(b) by 250 days.

(21) Appl. No.: 17/884,639

(22) Filed: Aug. 10, 2022

(65) Prior Publication Data

US 2023/0055955 A1 Feb. 23, 2023

(30) Foreign Application Priority Data

Aug. 20, 2021 (EP) .................................... 21192310

(51) Int. Cl.
*B25J 9/16* (2006.01)
*G02B 27/00* (2006.01)

(52) U.S. Cl.
CPC ........ *B25J 9/1697* (2013.01); *G02B 27/0093* (2013.01); *G05B 2219/40613* (2013.01)

(58) Field of Classification Search
CPC ... B25J 9/1697; B25J 9/1694; G02B 27/0093; G02B 21/32; G05B 2219/40613
See application file for complete search history.

(56) References Cited

U.S. PATENT DOCUMENTS

| | | | | |
|---|---|---|---|---|
| 2019/0061167 A1* | 2/2019 | Yoshino | .................... | B25J 13/06 |
| 2020/0261160 A1* | 8/2020 | Peine | ...................... | A61B 34/37 |
| 2020/0397225 A1* | 12/2020 | Schrader | ................ | B25J 19/023 |
| 2020/0397531 A1* | 12/2020 | Schrader | ............ | A61B 1/00194 |
| 2021/0244479 A1* | 8/2021 | Wassall | .............. | G02B 27/0172 |
| 2022/0378528 A1* | 12/2022 | Khalifa | .................. | A61B 34/70 |

OTHER PUBLICATIONS

Suligoj et al. "Object Tracking With a Multiagent Robot System and a Stereo Vision Camera", 24th DAAAM International Symposium on Intelligent Manufacturing and Automation, Vienna, Austria, 2013, Procedia Engineering, 69: 968-973, Mar. 25, 2014.
Yu et al. "EyeRobot: Enabling Telemedicine Using a Robot Arm and a Head-Mounted Display", Current Directions in Biomedical Engineering, 6(1): 20200019-1-20200019-4, May 2020.

* cited by examiner

*Primary Examiner* — Jason Holloway

(57) ABSTRACT

The present invention relates to a robotic imaging system (1), comprising an imaging device (10) with at least one objective (11), wherein the at least one objective (11) provides an optical axis (11*a*) extending in a focus direction of the objective (11), a robotic device (20) connected to the imaging device (10) to move and/or orient the imaging device (10), and a control device (30) configured to set a preset tool center point (TCP) and to control the robotic device (20) to move and/or orient the imaging device (10) with respect to the preset tool center point (TCP), wherein the preset tool center point (TCP) for moving and/or orientating the imaging device (10) is on the optical axis (11*a*) of the at least one objective (11) or on a virtual axis (12) corresponding to an averaged vector of respective optical axes (11*a*) of a plurality of objectives (11) of the imaging device (10).

13 Claims, 3 Drawing Sheets

ROBOTIC IMAGING SYSTEM AND METHOD FOR CONTROLLING A ROBOTIC DEVICE

RELATED APPLICATION

This application claims the benefit of priority of Europe Patent Application No. 21192310.7 filed on Aug. 20, 2021, the contents of which are incorporated by reference as if fully set forth herein in their entirety.

FIELD AND BACKGROUND OF THE INVENTION

The present invention relates to a robotic imaging system, a method for controlling a robotic device of such robotic imaging system and a respective computer program product.

Robotic imaging systems, such as robotic medical imaging systems, allow displaying and recording of images during operative procedures. To change a view on an object, an imaging device is connected to a robotic arm assembly to be moved thereby. A reference point for such movement is set with respect to the robotic arm assembly, e.g. with the origin of the robotic arm assembly opposed to the connection to the imaging device. The calculation and control of a respective movement of the imaging device by the robotic arm assembly may therefore become complex. In particular, with respect to the degrees of freedom to move the imaging device by the robotic arm assembly with a reference point distanced from the imaging device, the robotic arm system may be perform sweeping movements resulting in corresponding space consumption and being prone to collisions. In return, movement options may be restricted to limit space consumption and the risk of collisions. Furthermore, as a robotic arm assembly provides a comparatively low stiffness, a targeted position of the imaging device by a movement based on a distanced reference point may be subject to considerable tolerances.

Accordingly, it is an object of the present invention to provide a robotic imaging system, a method for controlling the robotic device of such robotic imaging system and a respective computer program product capable of providing an improved movement of the imaging device by a robotic device with respect to an object to be viewed.

The object is solved by a robotic imaging system according to claim 1.

SUMMARY OF THE INVENTION

According to one aspect of the present invention, a robotic imaging system comprises an imaging device with at least one objective, wherein the at least one objective provides an optical axis extending in a focus direction of the objective, a robotic device connected to the imaging device to move and/or orient the imaging device, and a control device configured to set a preset tool center point and to control the robotic device to move and/or orient the imaging device with respect to the preset tool center point. The preset tool center point for moving and/or orientating the imaging device is set to be on the optical axis of the at least one objective or on a virtual axis corresponding to an averaged vector of respective optical axes of a plurality of objectives of the imaging device.

With the preset tool center point being set on the optical axis of the of the at least one objective or an a virtual axis in defined relationship to optical axes of a plurality of objectives of the imaging device, a reference for a movement and/or orientation of the imaging device is shifted from the robotic device to the imaging device. This may also allow reducing a calculation of a movement and/or orientation of the imaging device with respect to the preset tool center point to a calculation of a relative movement and/or orientation, i.e. a relocation with respect to the preset tool center point, rather than calculating in absolute coordinates.

An imaging device may only comprise one objective. In such event, the control device sets the preset tool center point on the optical axis of the objective. An optical axis is an imaginary line extending in the direction a beam of light propagates. The optical axis is substantially coaxial with the beam of light. Depending on the respective objective and angle of incidence, the optical axis may pass, for example, through the center of a lens and coincides with the axis or rotational symmetry.

However, an imaging device may also comprise, for example, two objectives for stereoscopic imaging. In such event, the control device may set the preset tool center point on the virtual corresponding to an averaged vector of the optical axes of the two objectives. An averaged vector may represent both of the optical axes in terms of an averaged viewing angle. Preferably, the virtual axis corresponds to the averaged vector by being coaxially thereto. Alternatively, the virtual axis may correspond to the averaged vector according to a predetermined positional relationship, e.g. being offset in parallel to the virtual vector.

With a plurality of objectives comprised by the imaging device, the preset tool center point may be set by the control device with respect to one objective or a preselected subset of objectives. The control device may also be capable of changing an assignment of objectives for setting a preset tool center point. For example, the imaging device may comprise three objectives. For monocular imaging, the control device may select one of the objectives and sets the preset tool center point on the optical axis of the selected objective. For different viewing angles and/or different imaging settings due to objective properties, the control device may change the selection and therefore setting the tool center point on another optical axis according to the newly selected objective. However, if a stereoscopic imaging is intended, the control device may select two of the plurality of objectives and sets the preset tool center point on the virtual axis corresponding to the averaged vector of the respective optical axes of the selected objectives. Similar to the monocular imaging, the control device may also change the selection of objectives for stereoscopic imaging and adapts the preset tool center point accordingly. The control device may also select the three objectives for imaging in parallel and sets the preset tool center point on the virtual axis corresponding to the averaged vector of all of the optical axes.

In some embodiments, the virtual axis is a bisector of the angles of respective optical axes of the plurality of objectives of the imaging device.

For example, the virtual axis may be a bisector with respect to two optical axes of respective objectives. The virtual axis therefore lies in a plane defined by the two optical axes and bisects the angle spanned by the two optical axis according to the point of intersection of the two optical axes. With more than two objectives, the virtual axis may be a spatial bisector within a volume spanned by the plurality of optical axes. In other words, the virtual axis as spatial bisector extends through the point of intersection of the plurality of optical axis with a substantially equal distance to each of the optical axes.

Alternatively, the control device may be configured to assign a weighing factor to each of the optical axes to shift the virtual axis towards or away from one of the optical axes. The control device may adapt such weighing factor in accordance to different operating or viewing modes, for example, when changing from a 3D-mode to a 2D-mode or vice versa. However, the virtual axis may still extend through the point of intersection of the optical axes.

In some embodiments, the focus point of the at least one objective is set as the preset tool center point.

Accordingly, the preset tool center point corresponds to the focus point of the at least one objective. With the preset tool center point as focus point of the at least one objective, the imaging device may be moved around the preset tool center point by the robotic device with a radius corresponding to the focal length of the at least one objective. A respective movement may allow imaging of a predetermined point of interest of an object in different viewing angles.

Alternatively, the preset tool center point is set to be offset from the focus point of the at least one objective in a direction along the optical axis or the virtual axis.

A rotational movement of the imaging device around the preset tool center point being offset from the focus point may thereby allow the focus point to be moved along a curved surface with a radius corresponding to the offset between the preset tool center point and the focus point.

In some embodiments, the preset tool center point is set to be offset towards the imaging device.

Accordingly, the focus point may be moved along a concave surface to be imaged by a rotational movement of the imaging device around a respectively preset tool center point. In particular with respect to medical imaging, the preset tool center point being offset from the focus point towards the imaging device may allow an imaging of a substantially concave cavity or concave section of a cavity by a rotational movement of the imaging device around the tool center point. Preferably, the preset tool center point being offset from the focus point towards the imaging device is set to correspond to an opening of such cavity for optimized accessibility or an enhanced imaging range, respectively.

In some embodiments, the preset tool center point is set to be in the objective plane of the at least one objective or in an averaged objective plane of a plurality of objectives.

With one objective, the preset tool center point is set to be substantially in the objective plane of the objective. However, with the use of a plurality of objectives, which may be inclined with respect to each other, for example, to align the respective focus points on the same point of interest, the preset tool center point is set on the averaged objective plane of the plurality of objectives. For example, two objectives for stereoscopic imaging may define an averaged objective plane by a plane coincident with a straight line intersecting each of the objective centers and from which the optical axes extend in direction to their focus points. In other words, the preset tool center point in such configuration is set on a virtual axis extending in the middle between the two objectives in a height corresponding to the objective centers or an averaged height, respectively.

With the preset tool center point being set in the objective plane or averaged objective plane, turning the imaging device around such preset tool center point may allow to change the point of interest to be imaged. Such movement or change in the point of interest to be imaged mainly corresponds to a look around with minimal movements of the imaging device.

Alternatively, the preset tool center point is set to be offset away from the imaging device.

In accordance with the offset of the preset tool center point away from the imaging device, the preset tool center point is farther away from the imaging device than the focus point. By a rotational movement of the imaging device around such preset tool center point, the focus point may be moved along a convex surface with a radius corresponding to the distance between the preset tool center point and the focus point.

In some embodiments, the robotic imaging system comprises a tracking system configured to track a movement representative of an operator's movement and the control device is configured to control the robotic device to move and/or orient the imaging device with respect to a preset tool center point in accordance with the movement tracked by the tracking system.

A predetermined position of the operator or an object to be tracked by the tracking system may be set as reference position by the control device. The movement and/or orienting of the imaging device may thereby correlate to a change in position of the tracked operator or object. In other words, the movement and/or orientation of the imaging device may correspond to a relative movement rather than being calculated in absolute coordinates. In a variant, no predetermined position may be set and the position of the operator or object to be tracked when starting tracking for moving and/or orienting the image device is set as reference position. To avoid an unintended movement and/or orienting of the imaging device with any movement of the operator or representative object and/or for setting the current position as reference position, the control device and/or tracking system may be configured to require an activation of the tracking function. Such activation may be implemented by a footswitch, a predetermined recognized gesture, an input via a user interface or the like.

In some embodiments, the tracking system is configured to track a movement representative of an operator's head movement, in particular a movement of a head-mounted display being in operative connection with the robotic imaging system to be worn by the operator.

For example, a change of position of the operator's head is converted in a relative movement and/or orienting of the imaging device. The operator's head or a calculated origin thereof may thereby set as object to be tracked. In a variant, the tracking system may track a movement head-mounted display in operative connection with the robotic imaging system. In another variant, the tracking system may track the operator's head and the head-mounted display for plausibility checks. For example, a movement and/or orienting of the imaging device is only performed, when the tracked position and/or movement of the head-mounted display corresponds to a tracked position and/or movement of the operator's head. Otherwise, it is assumed that the head-mounted display is not moved by the operator and may therefore not be in use.

With tracking the operator's head and/or the head-mounted display, raising and lowering the operator's head like a nodding may be converted by the control device in a corresponding rotational movement about the preset tool center point with respect to a horizontal rotational axis corresponding to such nodding. The control device may therefore also be configured to consider the operator's or a respectively representing position and orientation of a viewing direction. As a result, when the operator's head is raised or lowered, the imaging device may be rotationally moved around the preset tool center point towards or away from the operator or vice versa.

Similarly, when the operator's head is tilted laterally, the imaging device may be moved rotationally about the preset tool center point with respect to a horizontal rotational axis corresponding to such lateral tilting.

In some embodiments, the control device is configured to control the robotic device to move and/or orient the imaging device with respect to the preset tool center point in accordance with the movement tracked by the tracking system with a predetermined scaling ratio.

As many movements by an operator may be unprecise with respect to a required accurate movement and/or orienting of the imaging device, a scaling ratio may be applied to convert a tracked movement in a reduced movement and/or orienting of the imaging device. This may also avoid the imaged object to immediately get out of sight when an excessive unintended movement is executed by a respective operator. In particular, since an operator is prone to execute small movements, which may cause blurred images if the imaging device follows such small movements, the control device may be configured to move and/or orient the imaging device only in the event of a minimum movement by an operator. A respective threshold for a change of position may therefore be set. However, such threshold may be more than the minimum movement and/or orienting of the imaging device. This potential conflict may also be mitigated by the predetermined scaling ratio. The predetermined scaling ratio may also improve the usability in terms of ergonomic considerations. As an example, an operator's head movement of 45° may only result in a movement of the imaging device by 10°. Accordingly, the predetermined scaling ratio is more than 1. Alternatively, the predetermined scaling ratio may be less than 1, for example, to allow the imaging device to be moved and/or oriented in an enhanced range with respect to tracked moving abilities.

In some embodiments, the control device is configured to provide different predetermined scaling ratios, in particular with respect to different moving directions of the movement tracked by the tracking system.

As a lateral tilting of the operator's head may provide an enhanced moving ability in comparison to a nodding, the predetermined scaling ratio for such lateral tilting conversion in a movement and/or orientation may be different from the predetermined scaling ratio with respect to a nodding. For example, the predetermined scaling ratio for a lateral tilting of an operator's head may be higher than the predetermined scaling ratio for a nodding.

In some embodiments, the control device is configured to adapt the preset tool center point and/or to control the robotic device and/or the imaging device to adapt the focus point of the at least on objective in accordance with the movement tracked by the tracking system.

Accordingly, the preset tool center point may be adapted by a respectively defined movement of the operator or an object representative of the operator to set a new preset tool center point. For example, an initial preset tool center point corresponding to a focus point may be offset along the optical axis or virtual axis in a direction away from the imaging device, when a cavity is intended to be observed instead of an exposed surface. Such offset for a respectively offset new preset tool center point may be performed, for example, by lowering of the operator's head.

Alternatively or in addition, the focus point may be adapted by moving the imaging device by the robotic system in a direction along the optical axis or virtual axis to relocate the focus point. Alternatively or in addition, the focus point may be adapted by adjusting the position of the at least one objective or changing the at least one objective or a configuration of objectives, for example, by controlling a revolver head with multiple objectives to replace or stack objectives. Hence, the focus point may be adapted by controlling the robotic device and/or the imaging device in accordance with a tracked movement representative of a respective control.

In some embodiments, the control device is configured to provide different operating modes to control the robotic device to move and/or orient the imaging device with respect to a preset tool center point or to adapt the preset tool center point and/or to control the robotic device and/or the imaging device to adapt the focus point of the at least one objective.

Due to limit the set of available functions with respect to a control of the robotic device to move and/or orient the imaging device with respect to a preset tool center point or to an adaption the preset tool center point and/or to a control of the robotic device and/or the imaging device to adapt the focus point of the at least one objective in accordance with a corresponding operating mode, the risk of executing unintended functions may be mitigated. For example, the control device may provide a movement mode to control the robotic device to move and/or orient the imaging device with respect to a preset tool center point, a tool center point mode to adapt the preset tool center point and a focus mode to control the robotic device and/or the imaging device to adapt the focus point of the at least one objective. Accordingly, different movements to be tracked may provide different functionalities depending on the currently selected operating mode. An operating mode may be selected based on a preset configuration of the control device and/or a head-mounted display in operative connection with the robotic imaging system, in accordance with an authorization level of the operator associated with the tracked movement, and/or a specific operating procedure. The control device may be configured to change the selective operating mode, for example, due to an operator's input via a footswitch or other input device, based on a predetermined gesture and/or upon receipt of other external trigger signal, like emergency events that require a movement of the imaging device out of a specific area for a better access to such area.

Alternatively or in addition to different operating modes, a movement of different body parts of the operator and/or objects representative of an operator's movement each assigned to a different functionality or set of functionalities may be tracked. For example, moving and/or orienting the imaging device may be executed in accordance with a tracked movement of the operator's head and/or a respective head-mounted display, while adapting the tool center point may be executed in accordance with a tracked movement of the operator's arm or hand. The robotic imaging system may therefore comprise more than one tracking system and/or a tracking system capable of distinguishing multiple objects to be tracked. In a variant, to allow the operator to take control without using hands or disturbing a manual task by moving an arm, different operator's head movements may be assigned to different functionalities. As the number of head movements may be limited, the control device may be adapted to provide different sets of restricted functionalities in such event to be selected in advance. Such selection may be subject to changes during a procedure.

In another aspect, the present invention relates to a method for controlling the robotic device of an robotic imaging system as previously described to move and/or orient the imaging device with respect to the preset tool center point, comprising the steps of tracking a movement representative of an operator's movement and controlling the robotic device to move and/or orient the imaging device with respect to a preset tool center point in accordance with the movement tracked by the tracking system.

Advantages and modifications of the method correspond analogously to the description of the robotic imaging system comprising the tracking system, configured to execute respective method steps. Specifically, functionally formulated features or features providing a described functionality of the corresponding robotic imaging system can be considered separately as features of the method.

The present invention relates in a further aspect to a computer program product comprising a program code stored on a machine-readable medium, and, when being executed on a data processing device, configured to cause the data processing device to execute the method as described above.

Accordingly, a robotic imaging system may be upgraded to execute the method as described above and in accordance with a respective robotic imaging system in an easy manner.

Further advantages, aspects and details of the disclosure are subject to the claims, the following description of preferred embodiments applying the principles of the disclosure and drawings. In the figures, identical reference signs denote identical features and functions.

DESCRIPTION OF SPECIFIC EMBODIMENTS OF THE INVENTION

Figure 1:
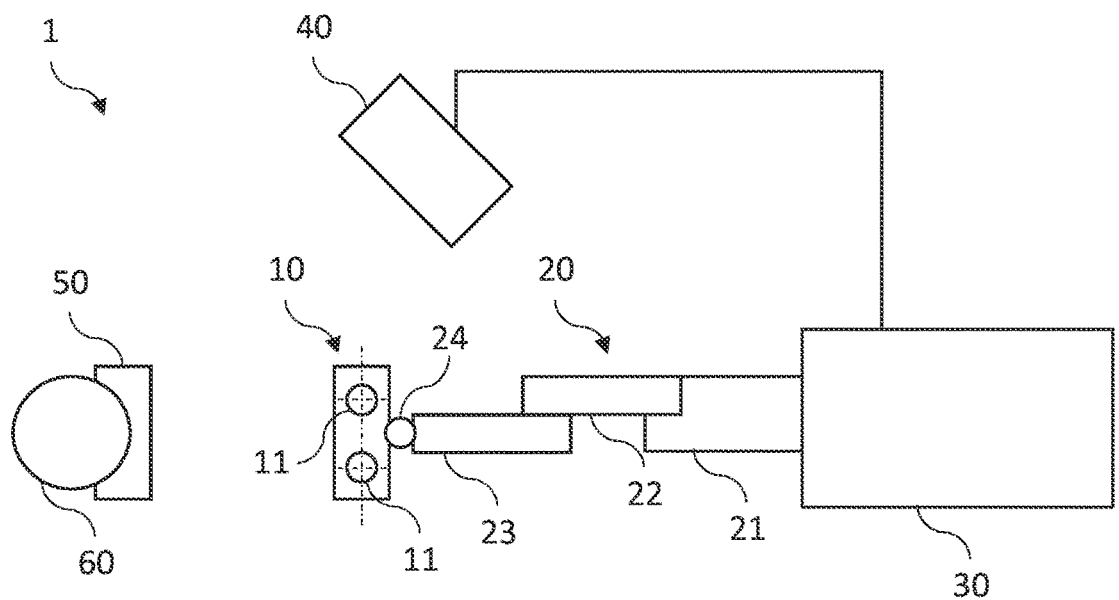
FIG. 1 is a schematic top view of a robotic imaging system according to an exemplary embodiment.

FIG. 1 shows a schematic top view of a robotic imaging system 1 according to an exemplary embodiment. The robotic imaging system 1 comprises an imaging device 10, a robotic device 20 to move and/or orient the imaging system 10, a control device 30 and a tracking system 40. In the exemplary embodiment, the control device 30 is a separate device. However, in alternative embodiments, the control device 30 may be incorporated in the robotic device 20 or in the imaging device 10. The control device 30 is configured to control a movement and/or orienting of the image device 10 via the robotic system. Specifically, the control device 30 is configured to control a first robotic arm 22 extending from a robotic base 21 in an articulation connection thereto, a second robotic arm 23 in articulated connection with the first robotic arm and an articulated joint 24, by which the imaging device 10 is connected to the robotic system 20, to move and/or orient the imaging device 10. The control device 30 controls the movement and/or orienting of the imaging device 10 in accordance with a tracked movement of head-mounted display 50 worn by an operator 60 by the tracking system 40. The head-mounted display is in operative connection with the robotic imaging device 1 to display images recorded by the imaging device 10. The head-mounted display 50 provides a preset tracking reference to be tracked. In alternative embodiments, the tracking system 40 may track a movement of the head of the operator 60 alternatively or in addition. The control device 30 converts a tracked change in the position of the head-mounted display 50 or the preset tracking reference, respectively, in a movement and/or orienting of the image device 10 by a respective control of the robotic system 20 with respect to a preset tool center point TCP as described later. In alternative embodiments, the tracking system 40 may provide the control device 30 with already respectively converted movement data to control the robotic system 20 by the control device 30 accordingly. The transfer of data from the tracking system 40 to the control device 30 is performed via a wired connection. In alternative embodiments, the transfer of data may be performed wirelessly.

In the exemplary embodiment, the imaging device 10 is a stereoscopic medical microscope. The imaging device 10 comprises two objectives 11 for the stereoscopic view. In alternative embodiments, the imaging device 10 may comprise only one or more than two objectives 11.

Figure 2:
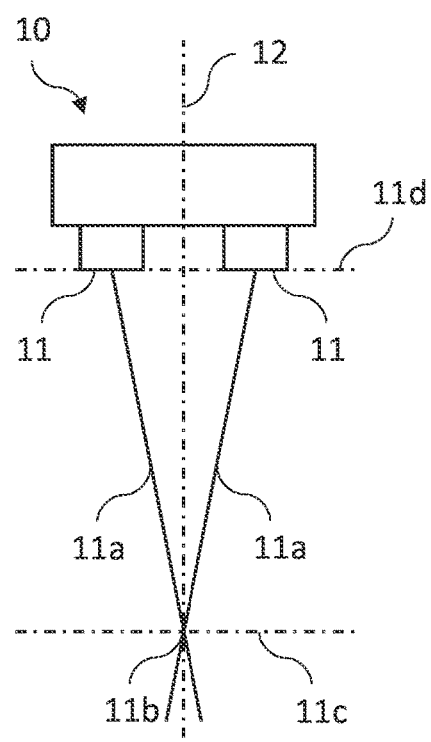
FIG. 2 is a schematic front view of the imaging device of the robotic imaging system according to the exemplary embodiment.

FIG. 2 shows a schematic front view of the imaging device 10 of the robotic imaging system 1 according to the exemplary embodiment. Each of the two objectives 11 is directed to a common focus point 11b. In other words, the optical axes 11a of the objectives 11 intersect each other in their respective focus points represented by the common focus point 11b. Since two optical axes 11a are provided, a reference to both objectives 11 in a direction of the optical axes 11a is represented by a virtual axis 12. The virtual axis 12 is a bisector of the optical axes 11a. A plane perpendicular to the virtual axis 12 intersecting the focus point 11b is a focal plane 11c. Further, the imaging device 10 comprises an objective plane 11d as averaged objective plane of the two objectives 11. The objective plane 11d corresponds to plane through the optical centers of the optical element or elements (not shown) of the objectives 11 with the optical axes 11a or the virtual axis 12 extending from such plane in direction of the focus point 11b.

Figure 3:
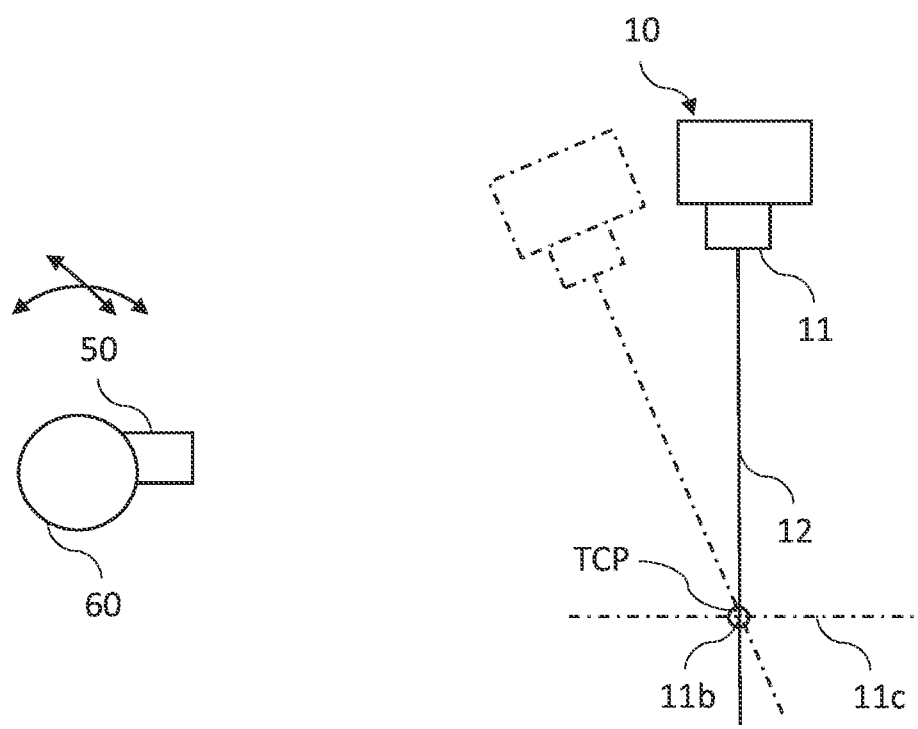
FIG. 3 is a schematic side view of the exemplary robotic imaging system with the focus point being set as preset tool center point.

FIG. 3 shows a schematic side view of the exemplary robotic imaging system 1 with the focus point 11b being set as preset tool center point TCP. Here, the control device 30 is configured to provide different operating modes with FIG. 3 showing movement mode to control the robotic device 20 to move and/or orient the imaging device 10 with respect to a preset tool center point TCP. Further, the control device 30 is configured to provide different sub modes in the movement mode. FIG. 3 represents a sub mode of controlling the robotic device 20 to move and/or orient the imaging device 10 with respect to the focus point 11b as preset tool center point TCP. In alternative embodiments, the control device 30 may be configured to only provide a control with the focus point 11b as tool center point TCP and/or may only provide a movement mode. Other operating modes and sub modes will be described later with reference to FIGS. 4 to 6.

With activation of the movement mode or the sub mode of the focus point 11b set as preset tool center point TCP, respectively, a tracked movement of the head-mounted display 50 is converted into a rotational movement the imaging device 10 about the preset tool center point TCP. In other words, the focus point 11b is kept in the same position while the viewing angle of the imaging device 10 is changed in correspondence with the movement of the head-mounted display 50 representative of a movement of the head of the operator 60. As indicated by the double arrows, the operator 60 may raise or lower his/her head to move the imaging device 10 about a first horizontal axis in the preset tool center point TCP towards or away with respect to the operator's position, or may tilt his/her head laterally to likewise tilt the imaging device 10 laterally about a second horizontal axis perpendicular to the first horizontal axis. The control device 30 converts the tracked movement in a movement of the imaging device 10 by a predetermined scaling ratio. Her, as an exemplary example, a movement of the head-mounted display 50 by 45° results in a respective rotation about the preset tool center point TCP of 10°. The position of the imaging device 10 after being moved is indicated by the dashed representation in FIG. 3.

Figure 4:
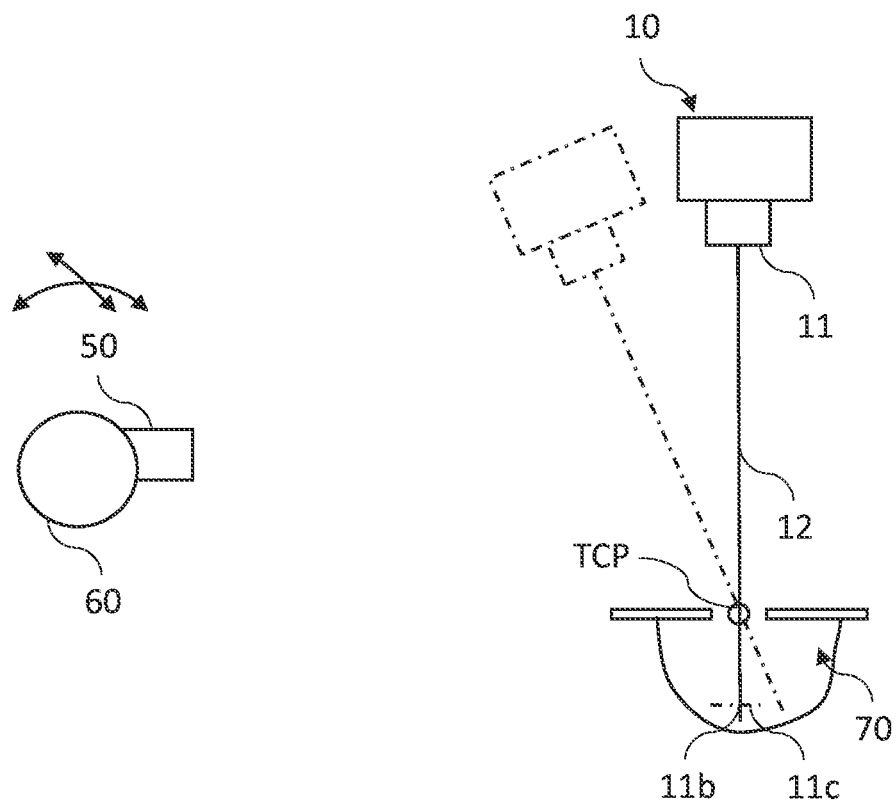
FIG. 4 is a schematic side view of the exemplary robotic imaging system with the preset tool center point being offset from the focus point.

FIG. 4 shows a schematic side view of the exemplary robotic imaging system 1 with the preset tool center point TCP being offset from the focus point 11b. The control device 30 still executes a movement mode but with a sub mode of the preset tool center point TCP being offset from the focus point 11b along the virtual axis 12 towards the imaging device 10. The preset tool center point TCP being offset from the focus point 11b towards the imaging device 10 may allow to image different positions within a cavity 70 along a concave path with a radius in accordance with the distance between the preset tool center point TCP and the focus point 11b. The preset tool center point TCP is set to be substantially positioned in a plane defined by the opening of the cavity 70 to allow an enhanced range of viewing angles without being restricted by the opening, which may be narrow. In alternative settings, for example, when imaging an exposed concave surface, the preset tool center point TCP may be freely selected in accordance with the curvature to be followed. This allows fewer efforts to adapt the focus point 11b in the event of a surface deviating from a curvature with a constant radius. Alternatively or in addition to adapting the focus point in such event, the control device 10 may be configured relocated the preset tool center point TCP. The tracked movement of the head-mounted display 50 as indicated by the double arrows in accordance to the ones of FIG. 3 results in a movement of the imaging device 10 as described with respect to FIG. 3 but with reference to a relocated preset tool center point TCP offset from the focal point 11b.

Figure 5:
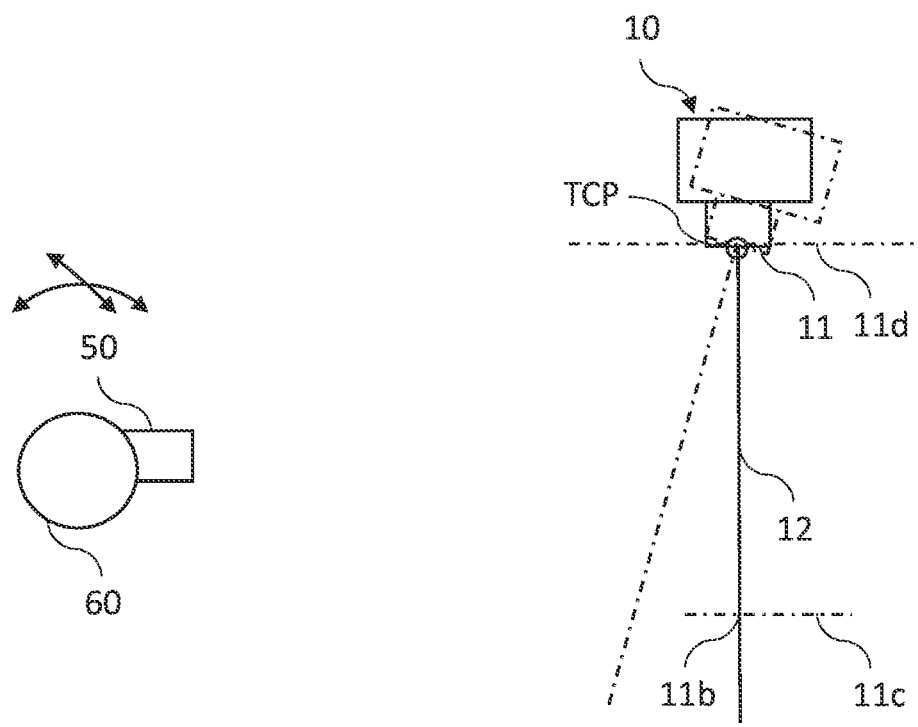
FIG. 5 is a schematic side view of the exemplary robotic imaging system with the preset tool center point being in the objective plane.

FIG. 5 shows a schematic side view of the exemplary robotic imaging system 1 with the preset tool center point TCP being in the objective plane 11d. The control device 30 still executes a movement mode but with a sub mode of the preset tool center point TCP on the virtual axis 12 being in the objective plane 11d. As apparent from the comparison between the initial position of the imaging device 10 and the position of the imaging device 10 after being moved as per the dashed representation, a look around may be accomplished while only slightly moving the imaging device 10. The tracked movement of the head-mounted display 50 as indicated by the double arrows in accordance to the ones of FIGS. 3 and 4 results in a movement of the imaging device 10 as described with respect to FIG. 3 but with reference to a relocated preset tool center point TCP set in the objective plane 11d.

Figure 6:
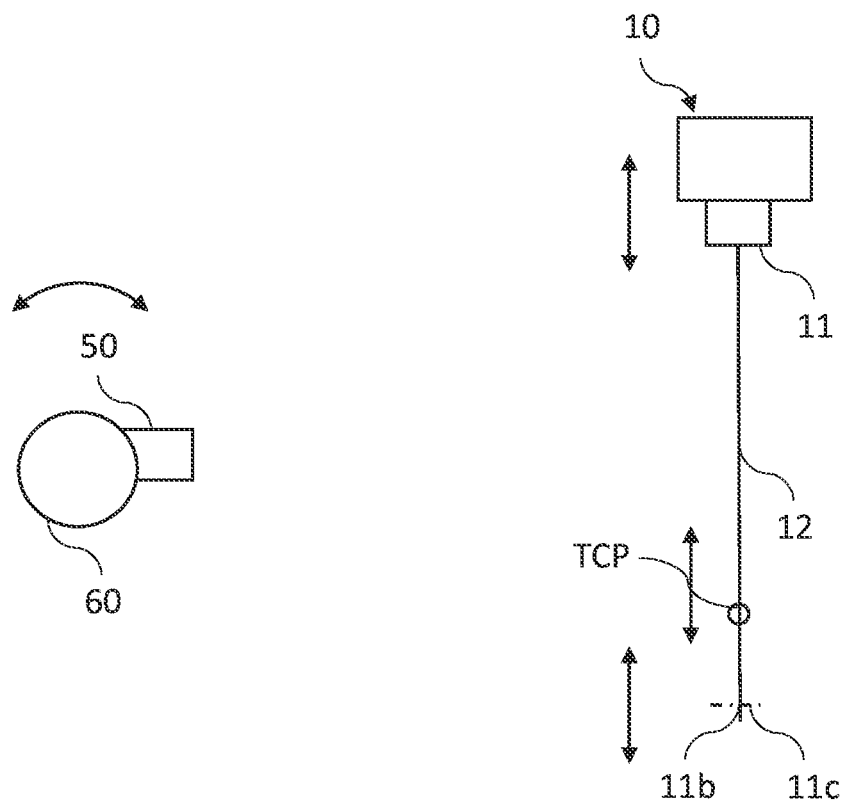
FIG. 6 is a schematic side view of the exemplary robotic imaging system with the focus point and/or tool center point being adapted.

FIG. 6 shows a schematic side view of the exemplary robotic imaging system 1 with the focus point and/or tool center point being adapted. The control device 30 may therefore execute a focus mode or tool center point mode. With respect to an exemplary focus mode, the control device 30 converts a tracked movement in accordance with raising or lowering of head-mounted display 50 in response to movement of the operator 60 as indicated by the double arrow in a corresponding relocation of the focus point 11b. In other words, a rotational movement of the head of the operator 60 is converted into a translational movement of the focus point 11b. The relocation of the focus point can be executed by moving the imaging device 10 accordingly and/or by adapting the focal lengths of the objectives 11. Similarly, the preset tool center point TCP is adapted in the tool center point mode by converting a tracked rotational movement of the head-mounted display 50 into a translational relocation of the preset tool center point TCP along the virtual axis 12.

The invention has been described herein with respect to exemplary embodiments. However, the invention is not limited to the exemplary embodiments. In particular, the control device 10 may be configured to execute different described functionalities in accordance with predetermined tracked movements without or independent from any operating mode.

REFERENCES 1 robotic imaging system
10 imaging device
11 objective
11a optical axis
11b focus point
11c focus plane
11d objective plane
12 virtual axis
20 robotic device
21 robotic base
22 first robotic arm
23 second robotic arm
24 articulated joint
30 control device
40 tracking system
50 head-mounted display
60 operator
70 cavity
TCP tool center point

What is claimed is:

1. A robotic imaging system, comprising:
an imaging device with at least one objective, wherein the at least one objective provides an optical axis extending in a focus direction of the objective,
a robotic device connected to the imaging device to move and/or orient the imaging device, and
a control device configured to set a preset tool center point and to control the robotic device to move and/or orient the imaging device with respect to the preset tool center point,
wherein the preset tool center point for moving and/or orientating the imaging device is set to be on the optical axis of the at least one objective or on a virtual axis corresponding to an averaged vector of respective optical axes of a plurality of objectives of the imaging device; and
wherein the preset tool center point is set to be offset from the focus point of the at least one objective in a direction along the optical axis or the virtual axis towards the imaging device to move the focus point along a substantially concave cavity or concave section of a cavity by a rotational movement of the imaging device around the preset tool center point, with the preset tool center point being set to correspond to an opening of the cavity.

2. The robotic imaging system according to claim 1, wherein the virtual axis is a bisector of the angles of respective optical axes of the plurality of objectives of the imaging device.

3. The robotic imaging system according to claim 1, wherein the preset tool center point is set to be in the objective plane of the at least one objective or in an averaged objective plane of a plurality of objectives.

4. The robotic imaging system according to claim 1, wherein the robotic imaging system comprises a tracking system configured to track a movement representative of an operator's movement and the control device is configured to control the robotic device to move and/or orient the imaging device with respect to a preset tool center point in accordance with the movement tracked by the tracking system.

5. The robotic imaging system according to claim 4, wherein the tracking system is configured to track a movement representative of an operator's head movement.

6. The robotic imaging system according to claim 4, wherein the control device is configured to control the robotic device to move and/or orient the imaging device with respect to the preset tool center point in accordance with the movement tracked by the tracking system with a predetermined scaling ratio.

7. The robotic imaging system according to claim 6, wherein the control device is configured to provide different predetermined scaling ratios.

8. The robotic imaging system according to claim 4, wherein the control device is configured to adapt the preset tool center point and/or to control the robotic device and/or the imaging device to adapt the focus point of the at least on objective in accordance with the movement tracked by the tracking system.

9. The robotic imaging system according to claim 1, wherein the control device is configured to provide different operating modes to control the robotic device to move and/or orient the imaging device with respect to a preset tool center point or to adapt the preset tool center point and/or to control the robotic device and/or the imaging device to adapt the focus point of the at least one objective.

10. A method for controlling the robotic device of a robotic imaging system according to claim 4 to move and/or orient the imaging device with respect to the preset tool center point, comprising:
   tracking a movement representative of an operator's movement; and
   controlling the robotic device to move and/or orient the imaging device with respect to a preset tool center point in accordance with the movement tracked by the tracking system.

11. A computer program product comprising:
   a program code stored on a machine-readable medium, and, when being executed on a data processing device, configured to cause the data processing device to execute the method according to claim 10.

12. The robotic imaging system according to claim 7, wherein the different predetermined scaling ratios are provided with respect to different moving directions of the movement tracked by the tracking system.

13. The robotic imaging system according to claim 7, wherein the tracking system is configured to track a movement of a head-mounted display in an operative connection with the robotic imaging system to be worn by the operator.

* * * * *